Dec. 3, 1968  F. SAMET  3,413,858

FLEXURE PIVOT

Filed Aug. 27, 1964

FRANK SAMET
*INVENTOR*

BY

*Thomas W. Kennedy*
ATTORNEY

3,413,858
FLEXURE PIVOT
Frank Samet, New York, N.Y., assignor to General Precision Systems Inc., a corporation of Delaware
Filed Aug. 27, 1964, Ser. No. 392,455
9 Claims. (Cl. 74—5)

The present invention relates to flexure pivots and more particularly to self-compensating flexure pivots.

A prior-art type of self-compensating flexure pivot as described in U.S. Patent No. 2,517,612, which is suitable for pivotally mounting a delicately supported member, such as a gyro gimbal or an accelerometer pendulum, on a supporting structure, has a pair of mounting plates interconnected by a pair of criss-crossed flexure strips. The pair of mounting plates are also separately interconnected by a compensating spring which compresses and preloads the flexure strips and exerts a compensating bending moment about the pivot hinge axis when the plates are angularly displaced. The compensating bending moment counterbalances the restraining moments of the flexure strips.

One problem with above-described, prior-art pivot is that the compressive preload on the flexure strips causes buckling, which is greatly magnified when the plates are angularly displaced. Another problem with this prior-art pivot is that the compensating spring tends to aid rather than resist a similarly directed component of any acceleration or vibration force, which may collapse the flexure strips, under compression. Still another problem with this prior-art pivot is that a variation in the magnitude of the compressive preload on the flexure strips can shift the location of the pivot hinge axis.

In accordance with one embodiment of the present invention, compressive preloading and buckling of the flexure strips is eliminated by using a different type of mounting plate and a different arrangement of the compensating spring. With this construction, the compensating spring applies a tension preload instead of a compressive preload. The compensating spring also exerts a compensating moment, which counterbalances the restraining moments of the flexure strips when the plates are angularly displaced.

Accordingly, it is one object of the invention to eliminate buckling stresses in the flexure strips of a self-compensating pivot.

It is another object of the invention to minimize bending stresses in the compensating spring of the self-compensating pivot.

It is a further object of the invention to provide a gyro having gimbals with restraint-free flexure pivots.

To the fulfillment of these and other objects, the invention provides a flexure pivot having a pair of mounting brackets, which are pivotable relative to each other about a common pivot axis, and which are disposed in a radial direction on opposite sides of the pivot axis. Each bracket has an arm portion extending in a radial direction across the pivot axis adjacent to its opposite bracket. The flexure pivot has a pair of criss-crossed, axially-spaced, flexure strips with respective end portions of each strip fixedly connecting to said brackets. The flexure pivot also has a compensating spring with opposite end portions connecting to said arm portions of said brackets for preloading the flexure strips in tension and for counterbalancing the null-seeking restraining moments of the flexure strips.

Other objects of the invention will become apparent upon reading the annexed detail description in connection with the drawings wherein like parts are designated by like numerals throughout the several views, and wherein.

Figure 1:
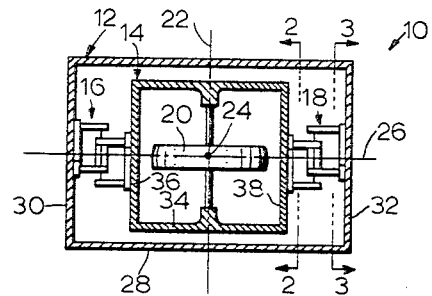
FIGURE 1 is a sectional view of a gyro.

Referring to FIGURE 1, one embodiment of the present invention is a gyro 10, which is a single-degree-of-freedom type of gyroscope. Gyro 10 comprises an outer housing or gimbal 12 and an inner gimbal 14 pivotally supported from said outer gimbal 12 by a pair of pivots 16, 18 for slight angular displacement of inner gimbal 14 relative to outer gimbal 12. Inner gimbal 14 supports a rotor 20, which has a spin axis 22. Gyro 10 also has a nominal input axis 24, which is disposed substantially at right angles to said spin axis 22, and has a pivot, output, or precession axis 26, which is disposed also substantially at right angles to a plane including axis 22 and axis 24. Pivots 16, 18 are coaxial along pivot axis 26.

Outer gimbal 12 has a peripheral wall 28, which is preferably a cylindrical shape concentric about pivot axis 26, and has a pair of axially-spaced end walls 30, 32.

Inner gimbal 14, which is surrounded by outer gimbal 12, also has a peripheral wall 34, which is concentric with peripheral wall 28 about axis 26. Inner gimbal 14 also has a pair of axially-spaced end walls 36, 38, which are disposed on the axially-inward sides of said walls 30, 32.

Figure 4:
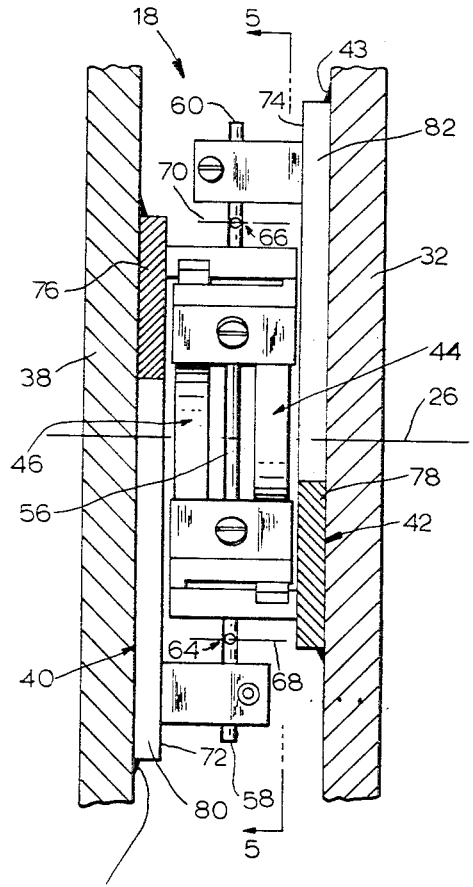
FIGURE 4 is an enlarged view of a portion of FIGURE 1.
Figure 5:
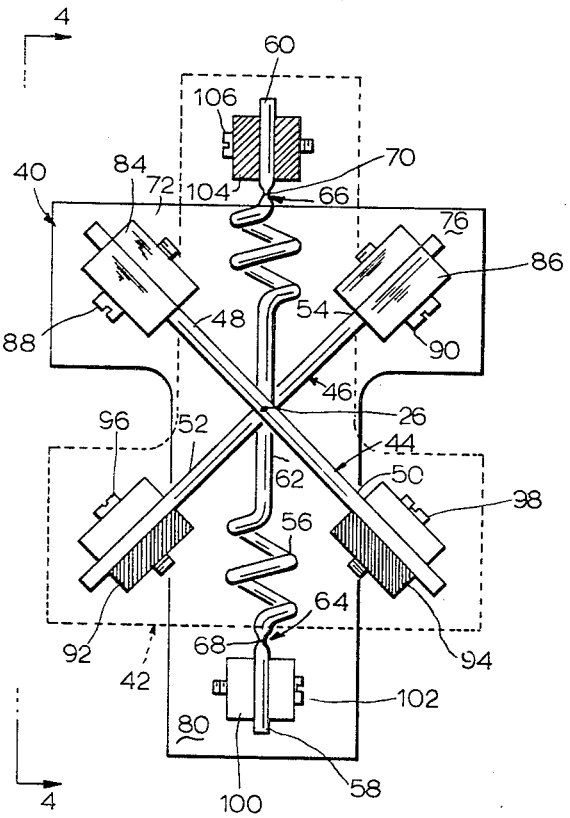
FIGURE 5 is a sectional view taken on line 5—5 of FIGURE 4.

Pivots 16, 18 are preferably identical in construction. For this reason, only pivot 18 is described hereafter in detail and illustrated in FIGURES 4 and 5. Pivot 16 has duplicate parts (not shown), which are identical to the parts of pivot 18.

Pivot 18 has a mounting bracket 40, which is fixedly connected to wall 38 (FIG. 4), and has a coaxial mounting bracket 42, which is fixedly connected to wall 32, and which is axially spaced from bracket 40. Brackets 40, 42 are joined to said walls 38, 32 by weld material 43, or the like. Pivot 18 also has a pair of flexure elements 44, 46, such as strips, wires, leaf springs, or the like, having respective end portions 48, 50 and 52, 54. Ends 48, 54 connect to bracket 40 and ends 50, 52 connect to bracket 42. In addition, pivot 18 also has spring means 56, such as an elongated coil spring, an arcuate bow spring or the like. Coil 56 has end portions 58, 60, which are fixedly connected to brackets 40, 42. Coil 56 also has a straight center portion 62 disposed between said ends 58, 60.

Flexure elements 44, 46 which are preferably made of thin metal strips, are criss-crossed at mid-span (as viewed along axis 26 in FIGURE 5), and are axially spaced along said axis 26 to form a hinge axis coincident with axis 26.

Coil 56, which is preferably made of spring wire of round cross-section, is disposed axially between strips 44, 46 to minimize pivot torsional forces. Center portion 62 is preferably straight rather than coiled to facilitate packaging of coil 56 between strips 44, 46, and to minimize the overall axial size of pivot 18. Ends 58, 60 have respectively necked-down portions 64, 66 of hinge-like construction having symmetrical back-to-back recesses. Hinge portions 64, 66 have respective hinge axes 68, 70, which are substantially parallel to each other and parallel to axis 26.

Brackets 40, 42 preferably have a uniform thickness and have a T-shaped profile. Brackets 40, 42 also have respective inner sides or faces 72, 74 facing each other, which are preferably flat, substantially parallel to each other, and substantially at right angles to axis 26. Brackets 40, 42 also have respective base portions 76, 78, which are the horizontal parts of the T-shaped profile, and have respective arm portions 80, 82, which are the vertical parts of the T-shaped profiles.

Base portions 76, 78 are preferably disposed on diametrically opposite sides of axis 26, when inner gimbal 14 and outer gimbal 12 are in a null position. Each arm 80 and 82 has one end integrally connected to its respective base 76 or 78 on one side of axis 26, and another end disposed on the opposite side of axis 26, so that the arm 80 or 82 of one bracket 40 or 42 is disposed adjacent to the base 78 or 76 of the other bracket 42 or 40. Arms 80, 82 are also diametrically opposite when inner gimbal 14 and outer gimbal 12 are in a null position.

Base 76 has connection clamps 84, 86, preferably of two-piece construction with respective clamping screws 88, 90, which are clamped to respective strip ends 48, 54. Base 78 has connection clamps 92, 94, of two-piece construction with respective clamping screws 96, 98, which are clamped to respective strip ends 52, 50. Arm 80 also has a connection clamp 100, preferably of one-piece, fork-like construction with a clamping screw 102, which is clamped to wire end 58; and arm 82 has a similar connection clamp 104 with a clamping screw 106, which is clamped to wire end 60.

Clamps 84, 86, 100 and 92, 94, 104 preferably are integral portions of their respective brackets 40, 42, project inwardly in an axial direction from respective inner sides 72 and 74, and are alternately interspaced in a peripheral direction about axis 26. Inner gimbal 14 has a null position relative to outer gimbal 12 when bracket 48 is oriented substantially 180° from bracket 42 about axis 26. At such null position, clamp 84 of strip 44 is diametrically opposite and oriented substantially 180° from its other clamp 94, and clamp 86 of strip 46 is similarly disposed diametrically opposite to its other clamp 92. Clamp 100 of coil 56 is similarly disposed diametrically opposite to clamp 104 at said null position. In addition, each pair of clamps are preferably disposed equi-distant in a radial direction from axis 26.

Figure 2:
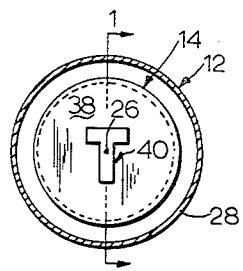
FIGURE 2 is a sectional view taken on line 2—2 of FIGURE 1.
Figure 3:
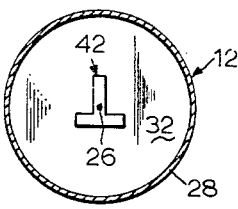
FIGURE 3 is a sectional view taken on line 3—3 of FIGURE 1.

In operation (FIG. 1), inner gimbal 14 moves clockwise or counter-clockwise (FIG. 2) about axis 26, depending on the direction of the input rate about axis 24. Assume inner gimbal 14 is displaced clockwise in FIG. 2 and that outer gimbal 12 is stationary. With this assumption, bracket 40 is angularly displaced clockwise about axis 26 relative to stationary bracket 42. Said displacement of bracket 40 causes a similar angular displacement clockwise of clamps 84 and 86 about axis 26 thereby causing strips 44, 46 to bend. Since outer gimbal 12, bracket 42, and clamps 92, 94 are stationary, strips 44, 46 resist such bending, thereby exerting counter-clockwise restraining moments against bracket 40 and inner gimbal 14 about axis 26. Said displacement of bracket 40 in a clockwise direction also causes a clockwise angular displacement of clamp 100 and wire end 58 about axis 26, thereby causing center portion 62 of coil 56 to be offset to the left (FIG. 5) of axis 26. The tensile preload force in coil 56 causes a clockwise moment against bracket 40 and inner gimbal 14 about axis 26, which substantially counterbalances the aforementioned restraining moments of strips 44, 46 thereon, whereby said restraining moments, that can cause gyro drift errors, are minimized. In addition, the tensile preload force of coil 56 has equal and opposite end reactions pulling its clamps in a radially inward direction toward each other thereby maintaining a tension force in each flex strip 44, 46 at null condition and when said strips 44, 46 are flexed.

In summary, this invention substantially eliminates buckling stresses in the flexure strips of a self-compensating pivot, minimizes bending stresses in the compensating spring of the pivot, and provides a substantially restraint-free flexure pivot.

While the present invention has been described in a preferred embodiment, it will be obvious to those skilled in the art that various modifications can be made therein within the scope of the invention. For example, brackets 40, 42 can be made as bearing sleeves whereby the pivot can be journaled in coaxial bore portions in the gimbals 12, 14. It is intended that the appended claims cover all such modifications.

What is claimed is:

1. A flexible pivot comprising:

a pair of mounting members; and means interconnecting said mounting members, including a pair of criss-crossed flexure elements and a compensating spring means for relative angular displacement of said mounting members about a common pivot axis;

said mounting members having respective base portions disposed on radially opposite sides of the pivot axis;

said flexure elements having radially opposite end portions fixedly connected to said base portions;

said mounting members having respective arm portions fixedly connecting to their respective base portions and extending to the opposite side of the pivot axis from their respective base portions; and said compensating spring means having end portions respectively connecting to said arm portions for preloading the flexure elements in tension and for counterbalancing the null-seeking restraining moments of the flexure elements.

2. The flexure pivot as claimed in claim 1, in which the compensating spring means is an elongate coil spring having fixed-type end connections.

3. The flexure pivot as claimed in claim 1, in which said compensating spring means has a necked-down portion adjacent each said end portion with a hinge axis that is substantially parallel to said pivot axis.

4. The flexure pivot as claimed in claim 1, in which said flexure elements are identical metal strips substantially intersecting the pivot axis at their midspans when the mounting members are in their null position.

5. The flexure pivot as claimed in claim 1, in which said compensating spring means is disposed axially inwardly of said flexure elements.

6. The flexure pivot as claimed in claim 1, in which said compensating spring means is prestressed by a preload force having a line of action substantially intersecting the pivot axis at right angles thereto when the mounting members are in their null position.

7. In a precision instrument having a supporting structure, a movable member, and a pair of pivot means pivotally mounting said movable member on said supporting structure and constituting the sole interconnection therebetween for limited angular displacement about a pivot axis fixed with respect to the structure and the member, each of said pivot means comprising:

pair of brackets respectively mounted on adjacent portions of said supporting structure and movable member, coaxial along said pivot axis, disposed on opposite sides of said pivot axis, each bracket having an arm portion extending across said pivot axis adjacent to the opposite bracket;

a pair of criss-crossed, axially-spaced flexure elements with respective end portions fixedly connecting to said brackets; and a compensating spring means with opposite end portions connecting to said bracket arms.

8. The precision instrument as claimed in claim 7, in which the supporting structure is a gyro outer gimbal, and the movable member is a gyro inner gimbal.

9. A flexure pivot comprising:

a pair of mounting brackets interconnected by a pair of criss-crossed flexure strips and a compensating spring means for pivoting of the brackets relative to each other about a common pivot axis on either side of a null position;

said mounting brackets having respective base portions and arm portions, said base portions being axially spaced along said pivot axis and disposed on radially opposite sides of the pivot axis, each of said arm portions extending from its respective base portion and across the pivot axis and alongside the opposite base portion;

said pair of criss-crossed flexure strips being axially spaced along said pivot axis with each strip having one end portion fixedly connecting to one base portion and an opposite end portion fixedly connecting to the other base portion; and said compensating spring means having one end portion connecting to one of the arm portions and an opposite end portion connecting to the other said arm portion whereby said brackets are urged away from each other in a radial direction and urged away from their null position in a peripheral direction.

References Cited

UNITED STATES PATENTS 2,517,612   8/1950   Varian _____ 74—5.34
2,606,447   8/1952   Boltinghouse _____ 74—5

C. J. HUSAR, *Primary Examiner.*